May 26, 1925.
P. D. SCHENCK
ADJUSTABLE BRACKET
Filed Oct. 19, 1923
1,539,277
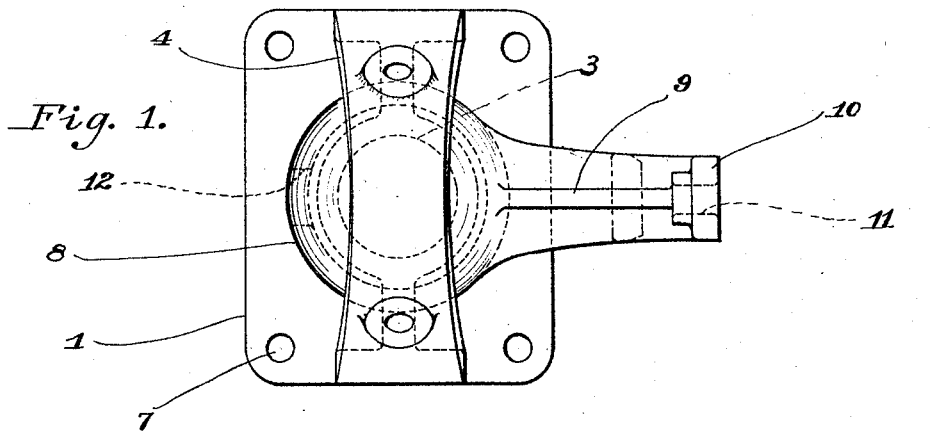
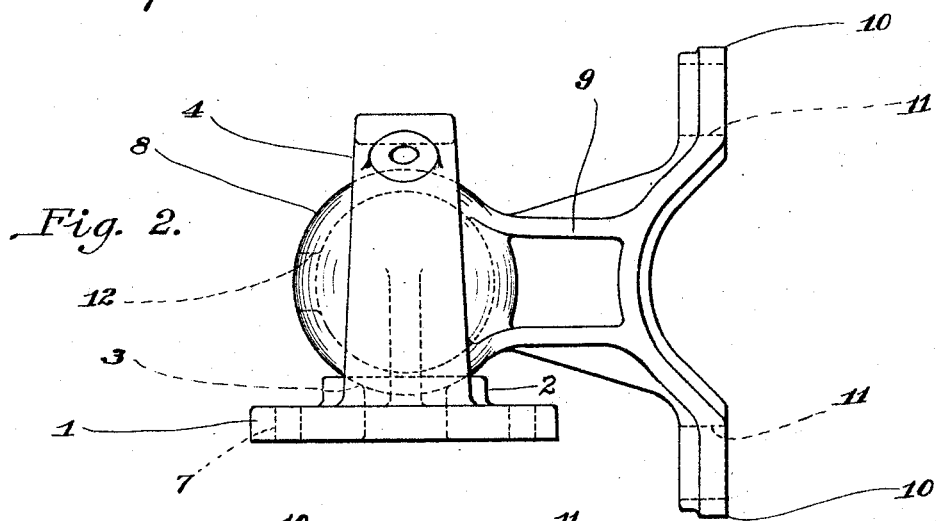
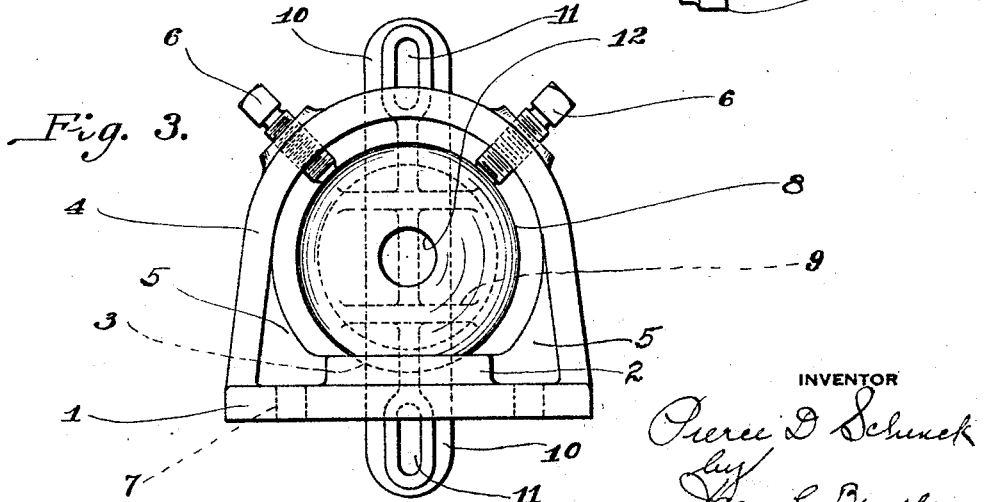
INVENTOR
Pierce D Schenck
by
James C. Bradley Patented May 26, 1925.

1,539,277

UNITED STATES PATENT OFFICE.

PIERCE D. SCHENCK, OF DAYTON, OHIO, ASSIGNOR TO THE DURIRON COMPANY, INC., A CORPORATION OF NEW YORK.

ADJUSTABLE BRACKET.

Application filed October 19, 1923. Serial No. 669,593.

*To all whom it may concern:*

Be it known that I, PIERCE D. SCHENCK, a citizen of the United States, and a resident of Dayton, in the county of Montgomery and State of Ohio, have made a new and useful invention in Improvements in Adjustable Brackets, of which the following is a specification.

The invention relates to adjustable brackets, and particularly brackets for supporting the guides for piece goods in textile plants, such guides being known in the art as "pot eyes". These guides or pot eyes are set at different angles, and the principal object of the present invention is the provision of a bracket of cheap simple construction which can be readily adjusted for any angle at which the guide may be set. One embodiment of the invention is shown in the accompanying drawings, wherein, Figure 1 is a plan view of the bracket. Fig. 2 is a side elevation. And Fig. 3 is an end elevation.

Briefly stated, the device comprises a pair of cooperating members in the form of castings, one of which is fixed and has a U shaped clamping arch or holder, and the other of which comprises a hollow base or sphere fitting in said holder and provided with a pair of perforated feet to which the pot eye is secured. The movable member is clamped in any desired position of adjustment by means of a pair of bolts extending through the walls of the U shaped holder and engaging the surface of the ball. The fixed member includes a base plate provided with a concave recess in which the ball fits, and such recess in connection with the bolts give a secure three point support for the ball.

Referring to the drawings, 1 is the base of the fixed bracket member, which plate is provided with the circular projection 2 having a concave recess 3 at its center for receiving the ball or sphere of the movable bracket member as hereinafter described. Extending over the projection 3 is the arch or U shaped holder 4, reinforced at its ends by the ribs 5, 5, which merge into the sides of the projection 2. The walls of the holder 4 are provided with a pair of perforations carrying the clamping bolts 6, 6, and the base plate 1 is provided at its corners with the perforations 7 whereby the plate may be held in fixed position by means of bolts or screws.

The movable bracket member consists of the hollow ball or sphere 8 and the laterally projecting portion 9 provided with the feet 10, 10, having the slots 11, 11 through which suitable bolts may be passed for supporting the pot eyes. The surface of the sphere or ball 8 fits into the concave recess 3 in the base plate and is securely clamped in any desired position of adjustment by means of the bolts 6, 6. This arrangement provides for a wide range of adjustment of the movable bracket member, and the recess 4 in connection with the two bolts positioned as indicated, give a secure three point support in all positions of adjustment.

The ball or sphere is made hollow to lighten the device, the hole 12 being provided to permit of the removal of the core employed in casting. As before indicated, both bracket members are castings, and as they require no machining, aside from the tapping of the holes for the clamping bolts or screws 6, 6, the cost of the device is reduced to a minimum. At the same time it has the strength necessary for the purpose for which it is designed and may be adjusted in every direction without difficulty.

What I claim is:

In combination in a bracket, a cast member comprising a base having a recess in the face thereof, and an inverted U-shaped member with its ends integral with such base and its concave portion extending over said recess in opposition thereto, an adjustable cast member including a hollow ball lying in said U-shaped member and engaging said recess, and a supporting portion projecting laterally from the ball, and a plurality of clamping bolts threaded through the curved portion of the U-shaped member and engaging said ball and lying radially with respect to said ball.

In testimony whereof, I have hereunto subscribed my name this 17th day of October, 1923.

PIERCE D. SCHENCK.